United States Patent [19]
Khan et al.

[11] Patent Number: 5,292,442
[45] Date of Patent: * Mar. 8, 1994

[54] PROCESS FOR DISPOSING OF SEWAGE SLUDGE

[75] Inventors: Motasimur R. Khan, Wappingers Falls, N.Y.; Harvey D. Schindler, Fair Lawn, N.J.; Christine C. Albert, Peekskill; Stephan J. DeCanio, Montgomery, both of N.Y.

[73] Assignee: Texaco Inc., White Plains, N.Y.

[*] Notice: The portion of the term of this patent subsequent to Feb. 23, 2010 has been disclaimed.

[21] Appl. No.: 955,007

[22] Filed: Oct. 1, 1992

[51] Int. Cl.$^5$ ............................................. B01D 37/00
[52] U.S. Cl. ............................ 210/770; 210/609; 210/751; 210/769; 210/774; 48/197 A
[58] Field of Search ............... 210/769, 774, 770, 761, 210/611, 603, 609, 751; 55/32; 48/210, 197 A, 346, 209; 44/605; 110/229

[56] References Cited

U.S. PATENT DOCUMENTS

| | | | |
|---|---|---|---|
| 3,549,524 | 12/1970 | Wiseman | 210/761 |
| 4,405,332 | 9/1983 | Rodriguez et al. | 44/605 |
| 4,657,681 | 4/1987 | Huges et al. | 210/774 |
| 4,840,736 | 6/1989 | Sander et al. | 210/770 |
| 4,933,086 | 6/1990 | McMahon et al. | 210/774 |
| 4,983,296 | 1/1991 | McMahon et al. | 210/774 |
| 5,037,561 | 8/1991 | Copeland | 210/770 |
| 5,141,526 | 8/1992 | Chu | 44/605 |
| 5,188,739 | 2/1993 | Yhan et al. | 210/774 |
| 5,188,740 | 2/1993 | Khan et al. | 210/774 |
| 5,188,741 | 2/1993 | Zang et al. | 210/774 |
| 5,190,672 | 3/1993 | Coenen et al. | 210/774 |

Primary Examiner—Robert A. Dawson
Assistant Examiner—Ana M. Fortuna
Attorney, Agent, or Firm—James J. O'Loughlin; Albert Brent

[57] ABSTRACT

A process for disposing of sanitary sewage sludge by producing a pumpable slurry of sewage sludge with or without solid carbonaceous fuel and burning said slurry as fuel in a partial oxidation gas generator, furnace, or boiler. The aqueous slurry of sewage sludge is concentrated by removing water by means of a conventional belt filter press, centrifuge, or hydroclone. The dewatered slurry of sewage sludge is heated by direct contact with steam while air and organic vapors are simultaneously removed, to reduce the pressure in the system; hydrothermally treated in two steps with indirect and direct heat exchange with steam; dewatered by flash evaporation and centrifuging; and burned with or without admixture with solid carbonaceous fuel in a partial oxidation gasifier, furnace, boiler, or incinerator to produce synthesis gas or a hot raw effluent gas stream. In a preferred embodiment, the effluent gas stream is cleaned and purified and non-contaminating ash and slag are separated. By this process, noxious sewage sludge may be disposed of without contaminating the environment. Synthesis gas, reducing gas, or fuel gas may be produced.

15 Claims, No Drawings

PROCESS FOR DISPOSING OF SEWAGE SLUDGE

FIELD OF THE INVENTION

This invention relates to the processing of sanitary sewage sludge for disposal as a fuel in a partial oxidation gas generator, furnace, or boiler.

Treatment of sewage sludge is discussed in coassigned U.S. Pat. No. 3,507,788. Sewage sludge is gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention by which a dewatered aqueous slurry of sewage sludge is heated by direct contact with steam and deaerated, subjected to hydrothermal a two-stage treatment, flashed, centrifuged, and burned. The viscosity of a pumpable slurry of sewage sludge for a given solids content is thereby reduced. A pumpable slurry fuel feed for burning in a partial oxidation gasifier, furnace, boiler, or incinerator is thereby made.

SUMMARY OF THE INVENTION

This invention pertains to an improved process for disposing of sanitary sewage sludge comprising:

(1) dewatering an aqueous slurry of sewage sludge to a solids content in the range of about 8 to 35 wt. %;

(2) heating the dewatered aqueous slurry of sewage sludge from (1) to a temperature in the range of about 120° F. to 210° F. and at atmospheric pressure by direct contact with steam, and holding said material at said elevated temperature for about 1.0 to 30.0 minutes while simultaneously removing off-gas comprising air, $H_2O$, and organic vapors;

(3) heating, mixing and shearing the aqueous slurry of sewage sludge from (2) by indirect heat exchange in the absence of air at a temperature in the range of about 210° F. to 350° F. and at a pressure of about 50 to 100 psig above the vapor pressure of water at that temperature, for a period in the range of about 2.0 to 10.0 minutes;

(4) hydrothermally treating the aqueous slurry of sewage sludge from (3) by direct steam injection in an autoclave in the absence of air and holding said material in said autoclave for about 15 to 120 minutes at a temperature in the range of about 450° F. to 600° F. and a pressure of about 50 to 100 psig above the vapor pressure of water at the holding temperature, while simultaneously removing off-gas comprising air, $H_2O$, organic vapors, $CO_2$, $H_2S$, and COS;

(5) suddenly reducing the pressure of the aqueous slurry of sewage sludge from (4) to a value in the range of about 700 to 25 psig and flash evaporating water to increase the solids content of said aqueous slurry of sewage sludge to about 25 to 55 wt. %;

(6) centrifuging the aqueous slurry of sewage sludge from (5) to remove water and to provide a solids content in the range of about 28 to 58 wt. %; and (7) burning said pumpable slurry of sewage sludge with or without admixture with supplemental solid carbonaceous fuel either: (a) in a furnace, boiler, or incinerator to produce a hot raw effluent gas stream; or (b) in a partial oxidation gas generator to produce a hot raw stream of synthesis gas, reducing gas, or fuel gas.

In one embodiment to avoid contaminating the environment, the effluent gas stream from (7) is cleaned, purified, and non-contaminating fly-ash and slag are separated from the gas stream.

In still another embodiment, the aqueous slurry of sewage sludge from (5) is ground together with solid coal in a rod mill to produce a pumpable aqueous slurry of sewage sludge having a solids content in the range of about 45 to 67 wt. %. This pumpable aqueous slurry of sewage sludge and coal is burned in a furnace, boiler, or incinerator to produce heat, steam, and flue gas. Alternatively, this aqueous slurry of sewage sludge and coal is burned in a partial oxidation gas generator to produce synthesis gas, reducing gas, or fuel gas depending on its composition.

By the subject process, pumpable slurries of sewage sludge and coal may be produced having a total solids content in the range of about 45 to 67 wt. % and comprising 5–7 parts by wt. of sewage sludge and 3–5 parts by wt. of coal. Thus, the pumpable slurries of sewage sludge and coal contain high concentrations of sewage sludge (sludge to coal weight ratio of 1:1 or greater).

DESCRIPTION OF THE INVENTION

Sewage sludge is a heterogeneous mixture of complex organic and inorganic materials. The term "sewage sludge" as used herein may be broadly defined as "water-carried wastes", particularly from municipal sanitary sewage lines, containing at least one of the following: body waste (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply. Sewage sludge is obtained from raw sewage and may contain a number of pathogens known to be health hazards to humans. Almost any type of microorganism may be found in sewage, including bacteria, protozoans, viruses and fungi.

Sewage sludge does not behave as a Newtonian fluid. Accordingly, any analyses of sludge flow behavior in pipes is rather difficult. A major problem is the energy (head) loss in sludge transfer due to friction. Sludge slurries with 10–15% concentration can be pumped provided high friction losses are allowable. The physical state of sludge depends upon the amount of moisture present in the sludge and on the nature of the sudge. As the moisture content decreases, the sludge changes state from a true liquid to a semi-solid and ultimately to a dry solid. Through the use of gravity thickening the sludge could approach 3–5% by weight of solids concentration. However, the void spaces between the particles are still filled with water. As the moisture content decreases further, the solids are pushed closer together. The capillary forces continue to increase in the pore structure which progressively decreases the sludge volume. At this point the sludge is considered almost solid (plastic or semi-solid) rather than a liquid. With a further reduction in water content the nature of sludge is changed to such a state that it will not flow under its own weight. Plastic sludges are cohesive in nature due to the surface chemical activity and the bonding properties of the organic and inorganic colloidal materials present.

With landfills closing, ocean dumping being curtailed, and high-technology incinerators becoming unpopular in many areas, communities are finding that it is getting increasingly more difficult and expensive to dispose of their sewage sludge. Pumpable aqueous slurries of sewage sludge are made by the subject process containing high concentrations of sewage sludge. The pumpable slurry may be used as a fuel in a partial oxidation gas generator and may be thereby disposed of without contaminating the atmosphere. After cleaning and removal of undesirable gases e.g. $H_2O$, $H_2S$, COS, $CO_2$, a non-polluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace. Noxious sewage sludge is safely disposed of by the subject process without polluting the nation's environment. Non-contaminating ash and slag are separated from the gas stream. The ash and slag may be used for road bed fill and for making cement blocks. Further, the subject process allows a greater amount of sewage sludge to be fed to a partial oxidation gasifier, boiler, or incinerator while requiring less energy per unit mass of sewage sludge processed.

A typical ultimate analysis of sewage sludge in shown in Table I. A typical ultimate analysis of inert non-combustible materials in sewage sludge is shown in Table II.

TABLE I

| TYPICAL ULTIMATE ANALYSIS OF COMBUSTIBLES IN SEWAGE SLUDGE | |
| --- | --- |
| ELEMENT | WT. % |
| CARBON | 54.6 |
| HYDROGEN | 7.9 |
| NITROGEN | 4.5 |
| OXYGEN | 32.0 |
| SULFUR | 1.0 |

TABLE II

| TYPICAL ANALYSIS OF INERT NON-COMBUSTIBLE MATERIALS IN SEWAGE SLUDGE | |
| --- | --- |
| ELEMENT | MG/KG DRY SOLIDS |
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping free received from the sludge generating community and the concentration of sewage sludge that can be included in a pumpable slurry destined for the gasifier. Mixtures of sewage sludge and solid carbonaceous fuel that contain sufficient sewage sludge to be profitably burned were found to be too viscous to be pumped. This problem and others have been overcome by the subject invention.

Sewage sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19-50. Detention time in the sedimentation tank is sufficient for producing a pumpable aqueous slurry of primary sludge having a solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, an aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. No. 3,687,646, which is incorporated herein by reference.

The water separated from the sewage sludge may be purified by conventional means. The purified water may be then used subsequently in the process. For example, the water may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat the aqueous suspension of sewage sludge. Hot water separated from the system may be used to prepare aqueous slurries of solid carbonaceous fuel e.g. coal. Excess water may be discharged from the system or used externally for industrial applications. The sludge underflow from the primary sedimentation tank comprising primary sewage sludge or from the holding tank comprising primary sewage sludge in admixture with secondary sewage sludge having a solids content of at least 3 wt. % is dewatered further to produce an aqueous slurry of sewage sludge having a solids content in the range of about 8 to 35 wt. %. Dewatering may be achieved by conventional means, e.g. filter press, hydroclone, centrifuge.

Preparation of a highly loaded sludge-water slurry with desirable rheological properties requires an understanding of primary sludge characteristics and the relationship of these characteristics to the basic interactions among sludge particles. Since the sludge materials contain numerous chemically active sites, the factors which influence the slurry properties are many.

In the first step of a preferred embodiment of the subject process, an aqueous slurry of sewage sludge having a solids content in the range of about 8 to 35 wt. % is heated at atmospheric pressure by direct contact with steam, for example in a vessel, while air and organic vapors are removed. Sweeping out the air and organic vapors reduces the subsequent pressure build-up within the equipment. The aqueous slurry of sewage sludge is then hydrothermally treated in two separate stages. In the first hydrothermal step, the aqueous slurry of sewage sludge is heated in a pressure vessel by indirect heat exchange. In the second hydrothermal step, the aqueous slurry of sewage sludge is heated to a higher temperature by direct injection of steam in an autoclave. Next, the aqueous slurry of sewage sludge is increased in solids content by flash evaporation and centrifuging. A feedstock comprising an aqueous slurry of sewage sludge, with or without admixture with dry solid carbonaceous fuel, is then reacted as the feed in a partial oxidation gasifier to produce synthesis gas, fuel gas, or reducing gas. Alternatively, said feedstock may be burned in a furnace, boiler or incinerator to produce heat, steam, and a stream of flue gas.

It was unexpectedly found that the morphology of sewage sludge is changed by treating the sewage sludge as specified herein. For example, bound water is released and slurry making is optimized. Slurries containing a higher concentration of solids can be achieved. In the first step of the subject process, sewage sludge is concentrated to a solids content of about 8 to 35 wt. % by means of conventional dewatering methods. For example, the aqueous slurry of sewage sludge may be pressed between two moving belts that pass between and over rollers. Liquid water is thereby quickly pressed from the material between the belts. For example, the Andritz Co., Arlington, Tex., continuous press filter operating at ambient conditions with a surface pressure of about 20 psi or more will produce a press cake having a solids content in the range of about 20 to 35 wt. % or more. In another embodiment, the sewage sludge may be concentrated by a combination of continuous belt pressure filtering and centrifuging.

Preferably, the aforesaid concentration takes place before any significant bacterial action occurs that consumes carbon and organic materials in the sewage sludge.

In the subject process, the dewatered slurry of sewage sludge having a solids content in the range of about 8 to 35 wt. % is heated at a temperature in the range of about 120° F. to 210° F., such as in the range of about 150° F. to 200° F. and at atmospheric pressure by direct contact with steam for a period in the range of about 1.0 minutes to 30 minutes, such as about 1 minute to 5 minutes. In one embodiment, low pressure steam e.q. 100 to 400 psig is injected into the aqueous slurry of sewage sludge in a vessel located upstream of a pump e.g. screw-type that may be used to convey the slurry of sewage sludge to the hydrothermal treatment zone. Entrapped air and organic vapors in the sewage sludge are displaced by injecting the low pressure stream. This eliminates the partial pressure contributed by heated air, and organic vapors and reduces the pressure in the following hydrothermal zone. Further, the steam heats the sludge and renders it more pumpable by decreasing its viscosity. Simultaneously, air, $H_2O$, and organic vapors are removed and sent to a water scrubber or burned in a pyrolysis unit or partial oxidation gas generator.

Next, the dewatered and heated aqueous slurry of sewage sludge is hydrothermally treated in two stages. In the first hydrothermal step, the aqueous slurry of sewage sludge is continuously passed through a steam jacketed horizontal tubular shaped heating, mixing and shearing means where the aqueous slurry is heated by indirect heat exchange in the pressure vessel in the absence of air at a temperature in the range of about 210° F. to 350° F. and at a pressure of about 50 to 100 psig above the vapor pressure of water at that temperature for a period in the range of about 2.0 to 10.0 minutes. One suitable apparatus for the first hydrothermal step provides one or two parallel shafts rotatably mounted in a horizontal tubular shaped housing with each shaft containing a plurality e.g. about 6 to 30 of agitators or mixing paddles or blades transversely attached to each shaft. One embodiment has two parallel shafts of agitators which rotate in the same direction at a speed of about 50 to 600 rpm within a chamber that conforms closely to the shape of the agitator assembly thereby providing a close clearance e.g. about 0.030" to 0.060" between the agitators and the inside wall of said chamber. A most effective heating, mixing, shearing and self-cleaning action is thereby provided. For example, a suitable continuous processor is made by Teledyne Readco of York, Pa. See U.S. Pat. No. 3,823,921, which is incorporated herein by reference. The flow rate of material through this continuous processor is in the range of about 50 to 600 lbs per minute. The rate of shear is about 5 to 200 $sec^{-1}$:, such as about 10 to 100 $sec^{-1}$. The particle size is in the range of about 1 to 1000 microns, such as about 20 to 200 microns. A homogeneous pumpable slurry having a solids content in the range of about 8 to 35 wt. % and a viscosity of less than about 2000 centipoise when measured at 180° F., such as less than about 1200 centipoise when measured at 180° F., is thereby produced.

Alternatively, the first hydrothermal stage may take place in a conventional double tube indirect heat exchanger, spiral heat exchanger, or shell and tube heat exchanger.

After the aforesaid first hydrothermal step, the aqueous slurry of sewage sludge is hydrothermally treated by direct steam injection in an autoclave. Thus, the sewage sludge from the first hydrothermal stage is again hydrothermally treated but this time in an autoclave at a temperature in the range of about 450° F. to 600° F., in the absence of air, for a residence time of about 15 to 120 minutes, such as about 30 to 90 minutes, and at a pressure which is about 50 to 100 psig above the vapor pressure of water at said temperature. A pumpable aqueous slurry of sewage sludge is thereby produced having a viscosity of less than about 700 centipoise when measured at about 180° F. Advantageously, by deaerating the aqueous slurry of sewage sludge early in the process prior to the first hydrothermal step, the pressure in the system is reduced and steam having a pressure in the range of about 467 to 1600 psig may be used to provide the thermal energy to heat up the aqueous slurry of sewage sludge in the second hydrothermal step.

Hydrothermal treating of sewage sludge as previously described causes decarboxylation and dehydrogenation of the sewage sludge. The sewage sludge fibers and gel structure break down. It was unexpectedly found that the higher heating value (HHV) of the carbonaceous fuel is upgraded about 10 to 20% by this two-stage hydrothermal treatment. Sewage sludge with a particle size in the range of about 5 to 20 microns is thereby produced. Aqueous slurries of sewage sludge with highly pumpable characteristics are thereby produced. Off-gas from the hydrothermal autoclave comprising air, $H_2O$, organic vapors, $CO_2$, $H_2S$ and COS is sent to a conventional odor control unit and/or disinfecting zone. Alternatively, the off-gas may be burned in a pyrolysis zone or in a partial oxidation gas generator. Noxious gases are thereby safely disposed of without polluting the nation's environment.

In one embodiment, hot water at a temperature in the range of about 300° F. to 500° F. may be removed from the first and/or second hydrothermal reactors and may be used in indirect heat exchange with the slurry of sewage sludge going to the first hydrothermal step. In another embodiment, a portion of the fuel gas produced by the subject partial oxidation mode is burned in a boiler to produce steam, for use in the aforesaid preheating and hydrothermal steps.

After the second hydrothermal step, the solids content of the hydrothermally treated aqueous slurry of sewage sludge is increased to a value in the range of about 15 to 47 wt. % to provide a pumpable aqueous slurry of sewage sludge by suddenly reducing the pressure of said aqueous slurry of sewage sludge from a value in the range of about 467 to 1600 psig to a value in the range of about 25 to 50 psig and flash evaporating off water.

Next, the flashed aqueous slurry of sewage sludge is centrifuged to remove additional water and to provide a solids content in the range of about 28 to 58 wt. %.. The centrifuged aqueous slurry of sewage sludge, with or without admixture with supplemental solid carbonaceous fuel, is burned in a furnace, boiler or incinerator to produce flue gas; or it is burned in a partial oxidation gas generator to produce synthesis gas, reducing gas, or fuel gas. Thus, the centrifuged sewage sludge may be mixed with supplemental solid carbonaceous fuel, such as dry coal or aqueous coal slurries at a temperature of about 180° to 300° F. to reduce the viscosity of the mixture. A final solids concentration of about 45 to 67 wt. % may be achieved. By the subject process, pumpable slurries of sewage sludge and coal e.g. anthracite or bituminous may be produced having a high concentration of sewage sludge e.g. sewage sludge 5-7 parts by wt.: coal 3-5 parts by wt.

In one embodiment to avoid contaminating the environment, the effluent flue gas or synthesis gas stream is cleaned, purified, and non-contaminating fly-ash and slag are separated from the gas stream.

In another embodiment, after the flash evaporation step (5) of claim 1 the flashed aqueous slurry of sewage sludge is ground in a rod mill with solid coal e.g. anthracite or bituminous to produce a pumpable aqueous slurry of sewage sludge and coal having a solids content in the range of about 45 to 67 wt. %. This aqueous slurry of sewage sludge and coal is burned in a furnace, boiler or incinerator to produce a hot raw effluent gas stream; or alternatively, burned in a partial oxidation gas generator to produce synthesis gas, reducing gas, or fuel gas.

By definition, the term solid carbonaceous fuel, as used herein to describe suitable solid carbonaceous materials is intended to include various materials and mixtures thereof from the group consisting of coal, coke from coal, char from coal, petroleum coke, particulate carbon, oil shale, tar sands, asphalt, wood, and pitch. The types of coal that may be used includes anthracite and bituminous. The particulate carbon may be that which is obtained as a by-product of the subject partial oxidation process (to be further described), or that which is obtained by burning fossil fuels. The term solid carbonaceous fuel also includes by definition semi-solid organic materials such as rubber and rubber-like materials including rubber automobile tires which may be ground or pulverized to the aforesaid particle size. Any suitable grinding system may be used to convert the solid carbonaceous fuels or mixtures thereof to the proper size.

The moisture content of the solid carbonaceous fuel particles is in the range of about 0 to 2 weight percent and preferably 0 to 1 weight percent. Predrying may be required in some instances to reach these levels.

The solid carbonaceous fuels are preferably ground to a particle size so that 100% of the material passes through an ASTM E 11-70 Sieve Designation Standard $425\mu$ (Alternative No. 40) and at least 80% passes through an ASTM E 11-70 Sieve Designation Standard 75 (Alternative No. 200). $1000\mu = 1$ mm. The ground solid carbonaceous fuel is then introduced into a storage hopper at room temperature and atmospheric pressure.

The higher heating value (HHV) of the slurry of sewage sludge with or without solid carbonaceous fuel as previously produced is in the range of about 6,000 to 12,000 BTU/Lb, say about 6,500 BTU/Lb. All of the higher heating values expressed herein are on the dry basis for the materials.

In a preferred embodiment, the fuel feedstream, for example, the aqueous slurry of sewage sludge with or without solid carbonaceous fuel, and a stream of free-oxygen containing gas are introduced by means of a burner into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference. The burner assembly is inserted downward through a top inlet port of the non-catalytic synthesis gas generator. The burner extends along the central longitudinal axis of the gas generator with the downstream end discharging a multiphase mixture of fuel, free-oxygen containing gas, and temperature moderator directly into the reaction zone.

A three or four stream annular-type burner, such as shown and described in coassigned U.S. Pat. Nos. 3,847,564 and 4,525,175, which are incorporated herein by reference, is preferably used to introduce the feedstreams into the partial oxidation gas generator. Other suitable burner designs may be used. For example, with respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole percent $O_2$. oxygen enriched air i.e. greater than 21 mole percent $O_2$, and air. The free-oxygen containing gas is supplied at a temperature in the range of about 100° F. to 1000° F. The aqueous slurry of pretreated sewage sludge with or without solid carbonaceous fuel e.g. coal is passed through the intermediate annular passage 16 at a temperature in the range of about ambient to 650° F.

In the partial oxidation process, the weight ratio of $H_2O$ to carbon in the feed is in the range of about 0.2 to 3.0, such as about 1.0 to 2.0. The atomic ratio of free-oxygen to carbon in the feed is in the range of about 0.85 to 1.5, such as about 1.0 to 1.2. Advantageously, the high amount of combined oxygen in the sewage sludge reduces the amount of free-oxygen.

The relative proportion of solid fuels, sewage sludge, water and oxygen in the feedstreams to the partial oxidation gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. The pressure is in the range of about 1–300 atmospheres. Preferably the temperature in the gasifier is in the range of about 2200° F. to 2800° F., so that molten slag is produced.

The dwell time in the reaction zone is in the range of about 1 to 10 seconds, and preferably in the range of about 2 to 8 seconds. With substantially pure oxygen feed to the partial oxidation gas generator, the composition of the effluent gas from the gas generator in mole percent dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and Ar nil to 1.5. With air feed to the gas generator, the composition of the generator effluent gas in mole percent dry basis may be about as follows: $H_2$ 2 to 20, CO 5 to 35, $CO_2$ 5 to 25, $CH_4$ 0 to 2, $H_2S+COS$ 0 to 3, $N_2$ 45 to 80, and Ar 0.5 to 1.5. Unconverted carbon, ash, or molten slag are contained in the effluent gas stream. Depending on the composition and use, the effluent gas stream from the partial oxidation gasifier is called synthesis gas, reducing gas, or fuel gas. Coal has a high ash content e.g. about 10 to 30 wt. %. Advantageously, when coal is used as the supplemental fuel the coal ash will encapsulate the non-combustible materials in the sewage sludge, and the encapsulated material will flow from the reaction zone of the gas generator as substantially inert non-contaminating ash and molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in a gas cooler. Advantageously, the steam produced by indirect heat exchange between boiler feed water and raw synthesis gas produced in a partial oxidation gas generator may be used in the process steps previously described that require direct and/or indirect heat exchange e.g. steps 2, 3 and 4 of claim 1. The gas stream from the partial oxidation gasifier or the flue gas from the furnace, boiler, or incinerator may be cleaned and purified by conventional methods. For example, reference is made to coassigned U.S. Pat. No. 4,052,176, which is included herein by reference for removal of $H_2S$, COS, and $CO_2$. Fly-ash and slag may be removed by quenching the process gas stream in a conventional quench tank and/or by scrubbing. See coassigned U.S. Pat. Nos. 3,232,728; 3,524,630; and 4,801,307, which are incorporated herein by reference.

Although modifications and variations of the invention may be made without departing from the spirit and scope thereof, only such limitations should be imposed as are indicated in the appended claims.

We claim:

1. A process for disposing of sewage sludge comprising:
   (1) dewatering an aqueous slurry of sewage sludge to a solids content in the range of about 8 to 35 wt. %;
   (2) heating the dewatered aqueous slurry of sewage sludge from (1) to a temperature in the range of about 120° F. to 210° F. and at atmospheric pressure by direct contact with steam, and holding said material at said elevated temperature for about 1.0 to 30.0 minutes while simultaneously removing off-gas comprising air, $H_2O$, and organic vapors;
   (3) heating, mixing an shearing the aqueous slurry of sewage sludge from (2) by indirect heat exchange in the absence of air at a temperature in the range of about 210° F. to 350° F. and at a pressure of about 50 to 100 psig above the vapor pressure of water at that temperature, for a period in the range of about 2.0 to 10.0 minutes;
   (4) hydrothermally treating the aqueous slurry of sewage sludge from (3) by direct steam injection in an autoclave in the absence of air and holding said material in said autoclave for about 15 to 120 minutes at a temperature in the range of about 450° F. to 600° F. and a pressure of about 50 to 100 psig above the vapor pressure of water at the holding temperature, while simultaneously removing off-gas comprising air, $H_2O$, organic vapors, $CO_2$, $H_2S$, and COS;
   (5) suddenly reducing the pressure of the aqueous slurry of sewage sludge from (4) to a value in the range of about 25 to 50 psig and flash evaporating water to increase the solids content of said aqueous slurry of sewage sludge to about 25 to 55 wt. %;
   (6) centrifuging the aqueous slurry of sewage sludge from (5) to remove water and to provide a solids content in the range of about 28 to 58 wt. %; and
   (7) burning said pumpable slurry of sewage sludge with or without admixture with supplemental solid carbonaceous fuel either: (a) in a furnace, boiler, or incinerator to produce a hot raw effluent gas stream; or (b) in a partial oxidation gas generator to produce a hot raw stream of synthesis gas, reducing gas, or fuel gas.

2. The process of claim 1 wherein the aqueous slurry of sewage sludge is concentrated in (1) by any one or a combination of the following steps:
   a. belt filter pressing,
   b. centrifuge,
   c. hydroclone 3. The process of claim 1 where in step (2) low pressure steam is injected into said aqueous slurry of sewage sludge from step (1) in a vessel located upstream of a pump used to convey the slurry of sewage sludge to step (3).

4. The process of claim 1 wherein the solid carbonaceous fuel in (7) is selected from the group consisting of coal, coke from coal, char from coal, petroleum coke, particulate carbon, oil shale, tar sands, asphalt, wood, pitch, rubber and rubber-like materials including ground automobile tires.

5. The process of claim 1 where the aqueous slurry of sewage sludge in (3) is processed in a steam jacketed heating, mixing, and shearing means comprising two parallel shafts rotatably mounted within a horizontal tubular shaped housing and with a plurality of agitators transversely attached to each shaft.

6. The process of claim 1 provided with the step of removing hot water at a temperature in the range of about 300° F. to 500° F. from the hydrothermal reactor in (3) and/or (4), and passing said hot water in indirect heat exchange with the aqueous slurry of sewage sludge going into step (3).

7. The process of claim 1 provided with the step of burning fuel gas produced in (7) (b) in a boiler to produce steam for use in (2), (3) and (4).

8. The process of claim 1 provided with the steps of burning the off-gas produced in (2) and (4) in the partial oxidation gas generator in 7 (b).

9. The process of claim 1 provided with the step of burning the off-gas produced in (2) and (4) in a pyrolyzer.

10. The process of claim 1 provided with the step of burning the off-gas produced in (2) and (4) in a partial oxidation gas generator.

11. The process of claim 1 provided with the steps of passing boiler feed water in indirect heat exchange with the hot raw effluent gas stream from 7(a) or the hot raw stream of synthesis gas, reducing gas, or fuel gas from 7(b) to produce steam, and using said steam in (2), (3) and (4).

12. The process of claim 1 wherein the hot raw effluent gas stream, or synthesis gas, reducing gas, or fuel gas from (7) is cleaned and purified.

13. The process of claim 1 wherein said solid carbonaceous fuel is coal and the slurry of sewage sludge and coal in (7) comprises 5-7 parts by wt. of sewage sludge and 3-4 parts by wt. of coal, and said slurry has a total solids content in the range of about 45 to 67 wt. %.

14. A process for disposing of sewage sludge comprising:
(1) dewatering an aqueous slurry of sewage sludge to a solids content in the range of about 8 to 35 wt. %;
(2) heating the dewatered aqueous slurry of sewage sludge from (1) to a temperature in the range of about 120° F. to 210° F. and at atmospheric pressure by direct contact with steam, and holding said material at said elevated temperature for about 1.0 to 30.0 minutes while simultaneously removing off-gas comprising air, $H_2O$, and organic vapors;
(3) heating, mixing and shearing the aqueous slurry of sewage sludge from (2) by indirect heat exchange in the absence of air at a temperature in the range of about 210° F. to 350° F. and at a pressure of about 50 to 100 psig above the vapor pressure of water at that temperature, for a period in the range of about 2.0 to 10.0 minutes;
(4) hydrothermally treating the aqueous slurry of sewage sludge from (3) by direct steam injection in an autoclave in the absence of air and holding said material in said autoclave for about 15 to 120 minutes at a temperature in the range of about 450° F. to 600° F. and a pressure of about 50 to 100 psig above the vapor pressure of water at the holding temperature, while simultaneously removing off-gas comprising air, $H_2O$, organic vapors, $CO_2$, $H_2S$, and COS;
(5) suddenly reducing the pressure of the aqueous slurry of sewage sludge from (4) to a value in the range of about 25 to 50 psig and flash evaporating water to increase the solids content of said aqueous slurry of sewage sludge to about 25 to 55 wt. %;
(6) grinding the aqueous slurry of sewage sludge from (5) together with solid carbonaceous fuel to produce a pumpable aqueous slurry of sewage sludge and solid carbonaceous fuel having a solids content in the range of about 45 to 67 wt. %; and
(7) burning said pumpable aqueous slurry of sewage sludge and solid carbonaceous fuel in a furnace, boiler, or incinerator to produce a hot raw effluent gas stream; or burning said aqueous slurry of sewage sludge in a partial oxidation gas generator to produce synthesis gas, reducing gas or fuel gas.

15. The process of claim 14 wherein said solid carbonaceous fuel in (6) is coal.

* * * * *